UNITED STATES PATENT OFFICE.

DANL. T. WILLSON, OF HARRISBURG, ASSIGNOR TO HIMSELF AND REUBEN HOFFHEINS, OF DOVER, PENNSYLVANIA.

IMPROVED SUBSTITUTE FOR ROSIN.

Specification forming part of Letters Patent No. 48,631, dated July 4, 1865.

*To all whom it may concern:*

Be it known that I, DANIEL T. WILLSON, of the city of Harrisburg, in the State of Pennsylvania, have discovered a useful Substitute for Rosin; and I do hereby declare that the following is a full and exact description thereof, sufficient to enable any person skilled in the arts to make and use the same.

Heretofore rosin has almost universally been used for the purpose of soldering metals together, and particularly by tinmen and manufacturers of like hardware. In fact, rosin for soldering purposes has, previous to my discovery, been in common use in the mechanic arts. It has also been used by foundrymen for the purpose of facilitating the casting of metals, the rosin being reduced to the condition of flour and mixed with the sand used for making castings, and especially for the formation of sand cores required for making hollow-ware. One reason of the use of rosin for this latter purpose is that when a sand core is made with rosin the casting is produced with a smoother surface, and is free, or nearly so, from flaws caused by the blowing of the metal in the act of casting. For the two purposes, therefore, above named rosin is peculiarly adapted. It is, however, very expensive, in view of its almost universal use for said purposes among many others to which it is adapted.

A substitute for rosin which, while it shall possess all its valuable qualities as a solder and for the purpose of casting metals, as above named, and which at the same time shall be greatly cheaper, is a desideratum long sought for. This substitute I have invented or discovered; and to produce it I take the substance commonly known as "coal-tar," and in a suitable vessel subject it to a continued degree of heat sufficient to boil it down to such a consistency that when cooled the mass will become hard, brittle, and no longer sticky. In this brittle and hardened state it may then be used as rosin is used for soldering purposes. It may also be reduced to a powdered state and mixed with sand for the purpose of casting metals, the same as rosin.

Having thus described my invention or discovery, what I claim as new, and desire to secure by Letters Patent of the United States, is—

The use of coal-tar, prepared substantially as described, as a substitute for rosin, for the purposes set forth.

Witness my hand in matter of my application for a patent for a substitute for rosin.

DANIEL T. WILLSON.

Witnesses:
JOHN MACLAUCHLIN,
J. G. YOUNG.